No. 731,303. PATENTED JUNE 16, 1903.
P. A. HOUGHTALING.
CLUTCH.
APPLICATION FILED MAR. 21, 1903.
NO MODEL.

Witnesses:-
Herman E. Metius
Titus H. Irons.

Inventor:
Paul A. Houghtaling.
by his Attorneys;
Howson & Howson

No. 731,303. Patented June 16, 1903.

UNITED STATES PATENT OFFICE.

PAUL A. HOUGHTALING, OF RIVERTON, NEW JERSEY.

CLUTCH.

SPECIFICATION forming part of Letters Patent No. 731,303, dated June 16, 1903.

Application filed March 21, 1903. Serial No. 148,897. (No model.)

*To all whom it may concern:*

Be it known that I, PAUL A. HOUGHTALING, a citizen of the United States, and a resident of Riverton, New Jersey, have invented certain Improvements in Clutches, of which the following is a specification.

My invention relates to certain improvements in power-transmitting devices, consisting more particularly in an improved form of clutch, the object of which is to provide a device of such construction that when one of the parts comprised by the driving and driven member is moved relatively to the other or when one of the parts is turned so as not to be operatively connected to the other the connecting element, commonly a ratchet, shall be held out of engagement with its coacting part, with the result that the clutch is noiseless when operated in the above-described manner. It is further desired to provide a device for transmitting power from a driving to a driven member which shall be simple in construction and reliable in operation.

The above objects I attain as hereinafter set forth, reference being had to the accompanying drawings, in which—

Figure 1:
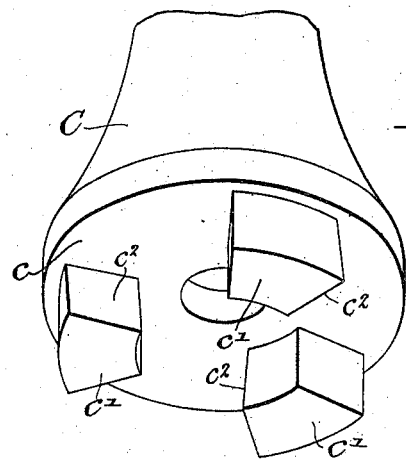
Figure 3:
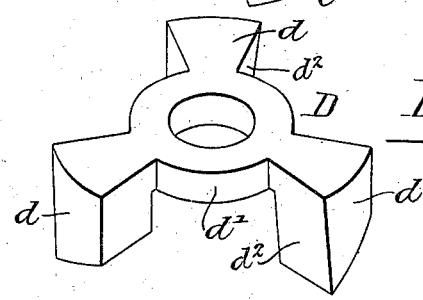
Figure 4:
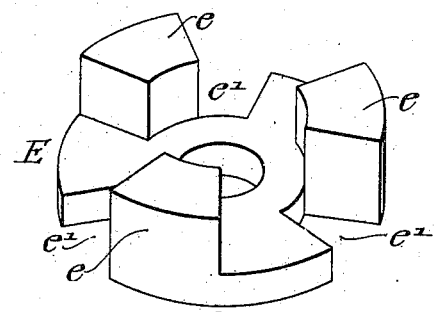
Figure 2:
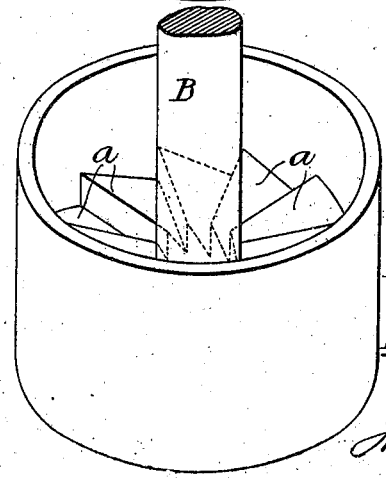

Figure 1 is a perspective view of one of the members of my improved clutch. Fig. 2 is a perspective view of the other member of the clutch. Fig. 3 is a perspective view of one form of ratchet, which in the present instance is the element by which the two members shown in Figs. 1 and 2 are operatively connected; and Fig. 4 is the piece by which the ratchet shown in Fig. 3 is retained in an elevated position when one of the members of the clutch is moved relatively to the other.

In the above drawings and in the following description I have shown my improved clutch as designed to be applied to a hand-operated brake, though it will be understood that the invention may be applied to any device in which power is to be transmitted from one member or device to another movable relatively thereto.

Referring to Fig. 2, A represents a cylindrical casing open at the top and having extending vertically through it a spindle B, attached to any desired form of mechanism or device and either formed integral with said casing or fastened rigidly to it in any desired manner. Projecting from the bottom of the casing in a plane substantially at right angles to the axis of the spindle and extending from the spindle to the wall of the casing A are a series of ratchet-teeth $a$, said teeth being preferably, although not necessarily, formed integral with or as a part of the casing A. A ratchet-piece D has toothed portions $d$, designed to act upon and engage the teeth $a$, these portions being connected to and operatively supported by a ring $d'$, through which passes the spindle B. It will be noted that these toothed sections are beveled to correspond with the bevel of the ratchet-teeth and have front faces $d^2$ slightly inclined to the axis of the spindle and rear faces which in the present instance are substantially radial to said axis.

The second member of the clutch is shown at C and may be described as consisting of a plate $c$, attached in any desired manner to a driving device or mechanism and having on its face a series of projections $c'$ of the same number as the teeth $d$ and provided with flat faces, of which those designated by $c^2$ are inclined to coact with the inclined faces $d^2$ of the ratchet-teeth $d$.

It will be noted that the segmental spaces between the individual projections $c'$ are greater than the angular width of the toothed portions fitting thereinto, and there are blocks $e$ fitting these spaces, respectively, so as to completely occupy the vacancies between the tooth portions and the projections $c'$. These blocks are carried on a plate E, freely revoluble on the spindle B and having portions of its body cut away for the passage of teeth $d$.

The various parts described above are so designed that the plate E, with its blocks $e$, fits easily within the casing A, so as to be free to turn, and rests normally upon the upper edges of the teeth $a$. The ratchet-piece D is made with its tooth-sections $d$ of such proportions that they freely pass through the cut-out portions $e'$ of the plate E and are movable vertically between the blocks $e$ on said plate and the projections $c'$ belonging to the member C.

In operation both ratchet-piece D and plate E are completely inclosed within the casing A, of which the plate $c$ forms the cover, and the tooth-sections $d$ are held by gravity in engagement with the teeth a. When now the member C is turned on its vertical axis in the direction of the hands on a watch, each of the projections c' engages one of the blocks e, which in turn pushes against the vertical faces of one of the teeth d, causing its sharp edge to engage and hold to one of the teeth a of the part A, thus operatively connecting the member C with the member A.

It will be understood that the number of the teeth d and of the parts coacting therewith may be varied according to the power to be transmitted, and in the present instance I have illustrated a clutch having three such tooth-sections. When motion of the member C is retarded, stopped, or reversed, each of the projections c' immediately bears against the front inclined face of a tooth d, and as this is moved backward relatively to the teeth a it will naturally ride upon the beveled surface thereof and be caused to move parallel with the spindle B. It will be seen, however, at the same time that the toothed portions d are moved backward the blocks e, which are engaged by the rear faces thereof, are also caused to revolve, and since there is more or less friction or opposition to the revolution of the plate E, which carries said blocks, the toothed portions d are gripped between the projections c' and said blocks e, so that when they have once been raised to a height sufficient to enable their sharp edge to pass the edge of one of the teeth a they will be held from returning to their normal position until relative motion of the two members of the clutch has ceased, such holding being materially assisted by the use of the inclined surfaces $c^2$ and $d^2$ of the projections c' and the tooth-sections d, respectively. With such construction there is consequently none of the objectionable chattering of the toothed sections or pawls over the ratchet-teeth a, and the clutch will operate noiselessly when turned backward or when the relative speeds of its members are varied.

While I have illustrated my improved clutch in a form suitable for use in connection with a hand-brake, it will be understood that it is applicable to any device in which a clutch may be employed, being particularly desirable where it is wished to retain the ratchet or connecting member out of engagement with the teeth while one of its members is moved at a different speed from the other.

I claim as my invention—

1. The combination in a clutch, of two members, one of which is provided with teeth, an element for operatively connecting said two members at will and constructed to engage said teeth, with means independent of said parts for automatically and positively holding said connecting element out of contact with the teeth of the toothed member, when said two members of the device are turned at different speeds, substantially as described.

2. The combination in a clutch, of two members, a ratchet on one of the same, a movable pawl member constructed to engage the ratchet and free to move away from said teeth, said pawl member having means constructed to operate against the action of gravity as long as the relative speeds of the two clutch members are different, for retaining it out of contact with the teeth, substantially as described.

3. The combination in a clutch of two members, one of the same having teeth lying in a plane substantially at right angles to its axis of revolution, a pawl member constructed to connect said two members and free to move parallel to the axis of revolution thereof, with means for engaging said pawl member and constructed to positively hold it out of engagement with the teeth when one of the members of the clutch is turned at a rate different from that of the other, substantially as described.

4. The combination in a clutch, of two members, a pawl for operatively connecting said two members and operatively connected with the second member so as to turn with the same while being free to move toward and from the first member, and a device for automatically clamping the pawl member to the second member of the clutch whenever the clutch members turn at different speeds, substantially as described.

5. The combination in a clutch, of two members, a movable block, a pawl member constructed to engage said first clutch member, and means on the second clutch member constructed to coact with said block to retain the pawl member out of engagement with the first member as long as the two members of the clutch are moved at different speeds, substantially as described.

6. The combination in a clutch, of two members, one of which is provided with a series of teeth and the other has a projecting portion, a pawl member movable toward and from one of said clutch members and situated between the same, with a plate carrying a block placed to engage the pawl member and hold it clamped against the projection of the second member of the clutch as long as the two members thereof turn at different speeds, substantially as described.

7. The combination in a clutch, of two members, a piece separate from said members and free to revolve around the axis of said clutch, means for retarding such revolution, a pawl constructed to engage one clutch member and having a surface designed to coact with said piece, the second clutch member having means for engagement with the pawl member and coacting with the revoluble piece to retain said pawl member out of engagement with the first member of the clutch when said clutch members turn at different speeds, substantially as described.

8. The combination in a clutch, of two members, one of the same having teeth, a pawl member and a plate supported between said two members, said plate and one of the members of the clutch having coacting means for retaining the pawl member in an elevated position out of engagement with the teeth under certain conditions of operation of said device, substantially as described.

9. The combination in a clutch, of a substantially cylindrical casing supported so as to be free to turn on its axis, a series of teeth within the casing, a second member having a portion designed to cover said casing and provided with a projecting part, a pawl member engaging said projecting part and designed to connect said two members, with a block revolubly supported within the casing upon the teeth for retaining the pawl member in an elevated position, and out of contact with said teeth when the two members are turned at different speeds, substantially as described.

10. The combination in a clutch, of two members, one of the same having teeth, a pawl member and a plate supported between said two members, said plate and one of the members of the clutch having coacting portions for retaining the pawl member in an elevated position out of engagement with the teeth under certain conditions of operation of said device, said coacting portions having adjacent surfaces inclined to the axis of revolution of the clutch, substantially as described.

In testimony whereof I have signed my name to this specification in the presence of two subscribing witnesses.

PAUL A. HOUGHTALING.

Witnesses:
   WILLIAM E. BRADLEY,
   JOS. H. KLEIN.